United States Patent [19]

Fehnel

[11] Patent Number: 5,517,673
[45] Date of Patent: May 14, 1996

[54] SYSTEMS AND METHODS FOR CELLULAR RADIOTELEPHONE SYSTEM ACCESS WITHOUT SYSTEM IDENTIFICATION COMPARISON

[75] Inventor: Michael D. Fehnel, Fuquay-Varina, N.C.

[73] Assignee: Ericsson Inc., Research Triangle Park, N.C.

[21] Appl. No.: 309,166

[22] Filed: Sep. 20, 1994

[51] Int. Cl.$^6$ ................ H04Q 7/00; H04Q 9/00
[52] U.S. Cl. ............ 455/33.1; 455/34.1; 455/33.2
[58] Field of Search ............... 455/33.1, 33.4, 455/34.1, 34.2, 54.1, 56.1, 62, 67.1

[56] References Cited

U.S. PATENT DOCUMENTS

| | | | |
|---|---|---|---|
| 4,750,198 | 6/1988 | Harper | 455/33.2 |
| 4,905,301 | 2/1990 | Krolopp et al. | 455/34.1 |
| 5,020,091 | 5/1991 | Krolopp et al. | 379/58 |
| 5,093,926 | 3/1992 | Sasuta | 455/34 |
| 5,101,500 | 3/1992 | Marui | 455/33 |
| 5,150,362 | 9/1992 | Akerberg | 370/95.1 |
| 5,159,625 | 10/1992 | Zicker | 379/59 |
| 5,255,307 | 10/1993 | Mizikovsky | 379/59 |
| 5,257,399 | 10/1993 | Kallin et al. | 455/56.1 |
| 5,257,400 | 10/1993 | Yoshida | 455/33.1 |
| 5,261,117 | 11/1993 | Olson | 455/34.1 |
| 5,357,559 | 10/1994 | Kallin et al. | 455/33.4 |

Primary Examiner—Reinhard J. Eisenzopf
Assistant Examiner—Tri Nguyen
Attorney, Agent, or Firm—Bell, Seltzer, Park & Gibson

[57] ABSTRACT

A cellular radiotelephone system is accessed by a cellular radiotelephone without requiring System IDentification (SID) comparison during access. Access is performed by eliminating a rescan of Access Channels during access and using the Combined Paging and Access Channel which was identified during initialization for system access. Alternatively, the Access Channels may be rescanned upon an access request and a comparison of the Digital Color Code with the initially scanned channels is made. If the compared Digital Color Code matches, the identified channel is used for system access regardless of its SID.

44 Claims, 7 Drawing Sheets

SYSTEMS AND METHODS FOR CELLULAR RADIOTELEPHONE SYSTEM ACCESS WITHOUT SYSTEM IDENTIFICATION COMPARISON

FIELD OF THE INVENTION

This invention relates to cellular radiotelephone systems and methods and more particularly to systems and methods for cellular radiotelephone access to a cellular radiotelephone system.

BACKGROUND OF THE INVENTION

Cellular radiotelephone systems are increasingly being used for wireless mobile communications. As known to those having skill in the art, a cellular radiotelephone system is a wide area communications network which utilizes a frequency reuse pattern in a plurality of cells. The design and operation of an analog cellular phone system are described in an article entitled "Advanced Mobile Phone Service" by Blecher, IEEE Transactions on Vehicular Technology, Vol. VT 29, No. 2, May 1980, pp. 238–244. The analog mobile cellular system is also referred to as the "AMPS" system.

Recently, digital cellular phone systems have also been proposed and implemented using a Time-Division Multiple Access (TDMA) architecture. Standards have also been set by the Electronics Industries Association (EIA) and the Telecommunications Industries Association (TIA) for an American Digital Cellular (ADC) architecture which is a dual mode analog and digital system following EIA/TIA standard IS-54B. Telephones which implement the IS-54B dual mode architecture are presently being marketed by the assignee of the present invention. Different standards have been promulgated for digital cellular phone systems in Europe. The European digital cellular system, referred to as GSM, also uses a TDMA architecture.

A cellular radiotelephone network includes a plurality of spaced-apart small radio zones called cells. Each cell includes a base station for transmitting and receiving messages to and from cellular radiotelephones which are located within the cell range. A plurality of base stations are connected to a Mobile Telephone Switching Office (MTSO) which acts as a controller for the cellular system. The MTSO is also connected to the Public Switched Telephone Network (PSTN) to allow communications between cellular radiotelephones and wire line phones.

As used herein, the term "cellular radiotelephone" encompasses a wide variety of portable radiotelephone devices which access a cellular radiotelephone system. Cellular radiotelephones include portable telephones of the hand-held or bag phone variety and permanently mounted car cellular telephones. The term "cellular radiotelephone" also includes terminals which provide functions in addition to those of a cellular telephone, such as facsimile, data communications, data processing, word processing applications and other personal communications systems functions. These high function cellular radiotelephones are often referred to as "Personal Communications Systems" (PCS).

Each cell of a cellular radiotelephone system typically includes a plurality of duplex voice channels over which cellular radiotelephone messages are carried. Each cell is also provided with a plurality of control channels to control the operation of the cellular radiotelephones and to assign voice channels. There are three basic types of control channels in the cellular radiotelephone systems described by EIA/TIA Standard IS-54B and other conventional cellular system standards. They are Dedicated Control Channels, Paging Channels and Access Channels. The cellular frequency band is typically divided into 832 channels of which 416 are allocated to a first carrier, known as the "A Carrier" and 416 are allocated to a second carrier, known as the "B carrier". Each carrier has its own set of channels that are distinct and non-overlapping in a given geographic area. Thus, it is ensured that upon initial access, a cellular radiotelephone will access its home system (either the A Carrier or the B Carrier).

Of the 416 channels allocated to each carrier, 21 channels are set aside to be used as Dedicated Control Channels. The Dedicated Control Channels are defined by the standard to occupy a specific limited channel range in the cellular network. These Dedicated Control Channels are used by a cellular radiotelephone initially to find service on the system of a desired type, either A or B. Since the channel numbers and therefore frequency of the Dedicated Control Channels are known in advance, the cellular radiotelephone can scan these channels to determine if service is available.

A plurality of Paging Channels are also provided. Paging Channels are channels to which cellular radiotelephones tune to and wait for page or other control messages. A plurality of Access Channels are also provided. Access Channels are channels to which a cellular radiotelephone sends responses to page and other control messages, or sends an origination request in response to a user request to place a telephone call.

A cellular carrier can define Access Channels to be separate from Paging Channels, and place the Access Channels in any valid range for the cellular system type. Separate Paging and Access Channels are typically not used, however, because of the complexity involved in setting up a cellular radiotelephone system in what is called split paging and access. Accordingly, most systems combine Paging and Access Channels to provide what will be referred to herein as "Combined Paging and Access Channels". In systems that use Combined Paging and Access Channels, a bit in the overhead message data (CPA) informs the cellular radiotelephone that the Paging and Access Channels are the same.

When a cellular radiotelephone is powered on, it performs an initialization procedure with the cellular radiotelephone system. In general, the cellular telephone first scans a stored range or set of Dedicated Control Channels which are assigned, one per cell, and are used by the cellular radiotelephone system to convey digital control information between the MTSO and the cellular radiotelephone. A multiple bit System IDentification (SID) is transmitted as part of the digital overhead information from the MTSO on the control channel. After this initial scan, the cellular radiotelephone selects the Dedicated Control Channel having the highest signal strength and stores the system identification of this Dedicated Control Channel in its memory. The channels of the Paging Channel set are then scanned for the strongest channels, and their identity is saved.

When scanning the Paging Channels, the SID of the Paging Channel and Access Channel is compared to determine whether an acceptable SID is present. It will be understood by those having skill in the art that an acceptable SID may be limited to the same SID as the Home SID or may broadly include a particular group of SIDs for which arrangements have been made by the home carrier, or any other combination of selected criteria.

After the above-described initialization procedure is complete, the cellular radiotelephone enters an "idle task" and awaits an indication that a system access is required. A system access may be required in response to an indication from the MTSO that the cellular radiotelephone is being called, also referred to as a "page". Other control messages which require a cellular radiotelephone response may also be received. Alternatively, the user of the cellular radiotelephone may attempt to place a telephone call, and thereby require access to the cellular radiotelephone system.

A major problem occurs when a system access is attempted by a cellular radiotelephone, and the cellular radiotelephone is in a geographic area of overlap between adjacent cellular radiotelephone systems. In this situation, the cellular radiotelephone may access the adjacent system when the cellular radiotelephone wishes only to access the "home" system. Since the adjacent system did not originate the telephone call to the cellular radiotelephone, and the cellular telephone is not registered to place telephone calls in the adjacent cellular system, the system access will fail. Alternatively, system access may occur via the adjacent system, thus penalizing the cellular telephone with roaming charges. Both of these situations are undesirable.

A known solution which prevents undesired access to an adjacent system is described in U.S. Pat. No. 4,905,301 to Krolopp et al. entitled "Selective System Scan for Multizone Radiotelephone Subscriber Units". According to the Krolopp et al. patent, an attempt to access an undesired radiotelephone system is prevented by comparing the SID transmitted on a Dedicated Control Channel of the desired radiotelephone system and the SID transmitted on an Access Channel during the access process. Access is permitted if the Dedicated Control Channel SID and the Access Channel SID match.

The above-described solution requires a comparison of SIDs between the Dedicated Control Channel and the Access Channel prior to permitting system access. There is a need to provide methods and systems which allow proper accessing of a cellular radiotelephone system by a cellular radiotelephone without requiring an SID comparison during access.

SUMMARY OF THE INVENTION

It is therefore an object of the present invention to provide improved cellular radiotelephone systems and methods.

It is another object of the invention to provide improved systems and methods for cellular radiotelephone system access.

These and other objects are provided, according to the present invention, by systems and methods for cellular radiotelephone system access which do not require System IDentification (SID) comparison during access. Two related aspects may be used to provide cellular radiotelephone system access without SID comparison. These two aspects may be used separately, or preferably are used in combination. The first aspect will be referred to as a "No Rescan" method and system and the second aspect will be referred to as a "DCC Compare" method and system. A combination method and system uses No Rescan followed by DCC Compare if No Rescan cannot be used. Both of these aspects allow system access without SID comparison.

According to the "No Rescan" aspect, during initialization, and prior to a required system access, at least one Control Channel having a predetermined SID is identified. It will be understood by those having skill in the art that the predetermined SID may be one or more Home SIDs which are permanently stored in the cellular radiotelephone by the cellular radiotelephone carrier upon initial activation of the cellular radiotelephone. However, due to agreements between cellular radiotelephone carriers, the predetermined SID may be a combination of the home SID and other SIDs for cellular carriers with whom roaming agreements are present.

Also during initialization, and prior to a required system access, a plurality of Combined Paging and Access Channels having the predetermined SID are identified. Then, in response to a required system access, the cellular radiotelephone uses one of the identified Combined Paging and Access Channels, and preferably the identified Combined Paging and Access Channel which had the highest signal strength during initialization, regardless of the SID transmitted by the one of the identified Combined Paging and Access Channels.

A rescan is not performed. Rather, the Combined Paging and Access Channel which was identified during the initial scan is used for system access. By not requiring a rescan, the time to perform a system access is reduced. Moreover, since initial scans are typically repeated every five minutes or less, the No Rescan aspect will often result in a satisfactory access, without an SID compare.

The "DCC Compare" aspect may be initiated if the Combined Paging and Access Channel obtained from the "No Rescan" aspect has insufficient signal strength to provide a system access. Alternatively, the DCC Compare aspect may be initiated upon a required system access without first performing the "No Rescan" aspect. According to the "DCC Compare" aspect, in response to a required system access, a rescan of the Access Channels is performed and a plurality of second Access Channels are identified. The second Access Channels are identified regardless of the SID transmitted by the second Access Channels. For example, the strongest Access Channels are identified in the rescan, without comparing the SID of the second Access channels with the SID of the Dedicated Control Channel which was identified during initialization. Instead, the Digital Color Code (DCC) of at least one of the second Access Channels is compared with the DCC of the corresponding Access Channel which was identified during initialization. As is well known to those having skill in the art, the DCC is a two-bit identifier which is conventionally used to generate a coded DCC for use during the access. If the DCCs match, the identified second Access Channel is used to access the cellular radiotelephone system, regardless of the SID transmitted by the second Access Channel.

It will be understood that a match of the DCC does not guarantee that the desired cellular radiotelephone system has been accessed. In particular, since there are four values for the two-bit DCC, there is a maximum probability of 25% that the DCCs of adjacent systems will inadvertently match. However, cellular telephone carriers generally ensure that DCCs of adjacent cells do not match, so that the probability of improper system access is actually far less than 25%.

The present invention allows a system access without the need for a rescan. Since it can take up to 1.5 seconds to obtain an SID, the present invention provides rapid system access in response to a user request or a system request. Moreover, if a rescan is required, it may be accomplished without comparing SIDs while still minimizing the likelihood of access to an undesired cellular radiotelephone system.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
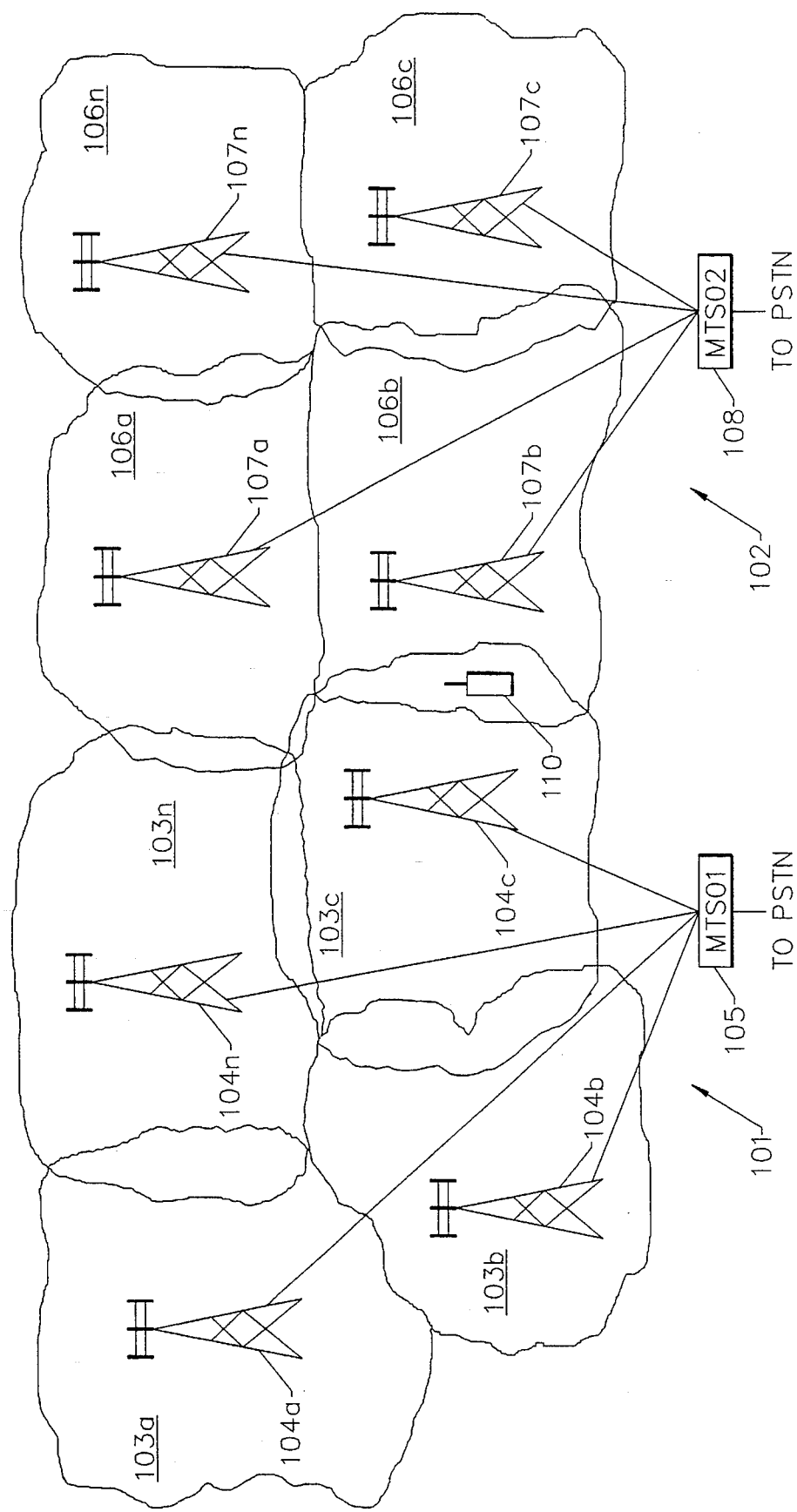
FIG. 1 is a block diagram of two conventional adjacent and overlapping cellular radiotelephone systems.

Referring now to FIG. 1, a block diagram of two conventional adjacent and overlapping cellular radiotelephone systems is illustrated. As shown, first cellular radiotelephone system 101 includes a plurality of first cells 103a–103n, each of which is defined by a corresponding one of first cellular base stations 104a–104n. Each first cellular base station 104a–104n is connected to a first mobile telephone switching office (MTSO) 105 for providing control and other well known cellular radiotelephone system functions. MTSO 105 is also connected to the Public Switched Telephone Network (PSTN-the wire telephone network). A corresponding second cellular radiotelephone system 102 is also illustrated with second cells 106a–106n, corresponding second cellular base stations 107a–107n and second MTSO 108. The design of cellular radiotelephone systems 101 and 102 is well known to those having skill in the art and will not be described further herein. For purposes of explanation, the operation of cellular systems conforming to EIA/TIA Standard IS-54B will be described. However, it will be understood by those having skill in the art that the present invention may be used with any cellular system.

A cellular radiotelephone 110 is also shown in FIG. 1. It will be understood that cellular radiotelephone 110 may freely move throughout the geographic area and may typically obtain service from either the first cellular radiotelephone system 101 or the second cellular radiotelephone system 102, depending on the arrangements made between the user of the cellular radiotelephone and each of the cellular systems. As shown in FIG. 1, the cellular radiotelephone 110 has travelled to a geographic area in which the radio coverage from cell 103c and cell 106b overlap. It is desired for the cellular telephone 110 to obtain service from the cellular radiotelephone system to which the cellular radiotelephone 110 has tuned its Dedicated Control Channel, for example system 101. However, under the conditions shown in FIG. 1, the cellular radiotelephone 110 may attempt a system access via the Paging and Access Channels of cellular radiotelephone system 102. The present invention aids in avoiding this problem without requiring a system identification comparison in the process.

Figure 2:
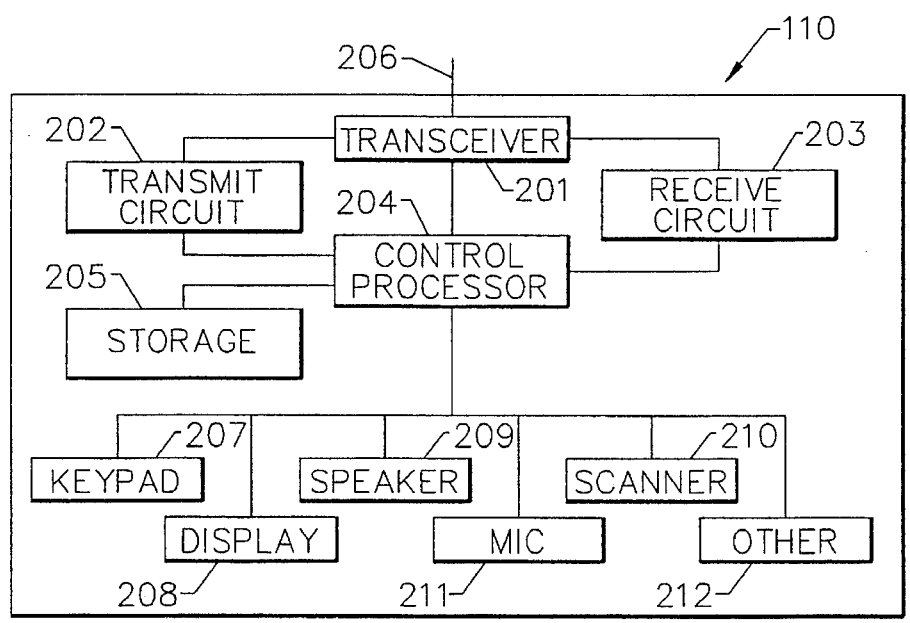
FIG. 2 is an electrical block diagram of a cellular radiotelephone.

Referring now to FIG. 2, an electrical block diagram of a cellular radiotelephone including cellular radiotelephone system accessing means according to the present invention will now be described. As shown, cellular radiotelephone 110 includes a transceiver 201 or other means for communicating with the cellular radiotelephone system. Transceiver 201 is connected to antenna 206. Cellular radiotelephone 110 further includes a control processor 204. Storage means 205 is electrically connected to control processor 204 to provide a storage capacity for program and data information. Storage means 205 may include conventional readable and writable memory such as RAM or EEPROM as well as read only memory (ROM).

Transceiver 201 may be selected to generate and receive signals conforming to any standard including but not limited to AMPS, ETACS, NMT450, NMT900, GSM, DCS1800 or IS-54B. Transmit circuit 202 and receive circuit 203 perform transmit and receive signal processing respectively.

As further shown in FIG. 2, cellular radiotelephone 110 also typically includes a keypad 207, a display 208, a speaker 209 and a microphone 211. In order to provide a computer communications terminal for receipt and transmission of audio, video and data and/or multimedia signals, keypad 207 may be a full scale personal computer keyboard and display 208 may be a large graphics display. A scanner 210 may be also be provided, as may other devices 212 such as disk drives and modems to provide a Personal Communication System (PCS) terminal. The design of cellular radiotelephone 110 is well known to those having skill in the art, and need not be described further herein.

According to the invention, cellular radiotelephone 110 also includes means for accessing a cellular radiotelephone system. The cellular radiotelephone system accessing means is preferably embodied in a stored program in storage means 205 which is executed by control processor 204 to control the components of cellular radiotelephone 110 during a system access. However, it will also be understood by those having skill in the art that discrete hardware may also be provided for system access control.

Figure 3A:
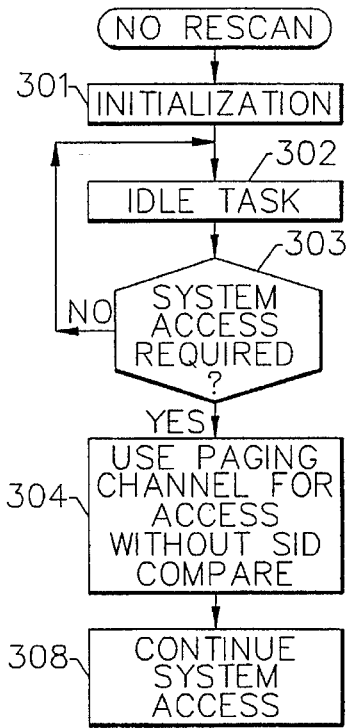
FIGS. 3A–3C illustrate three alternate embodiments for accessing a cellular radiotelephone system according to the present invention.
Figure 3B:
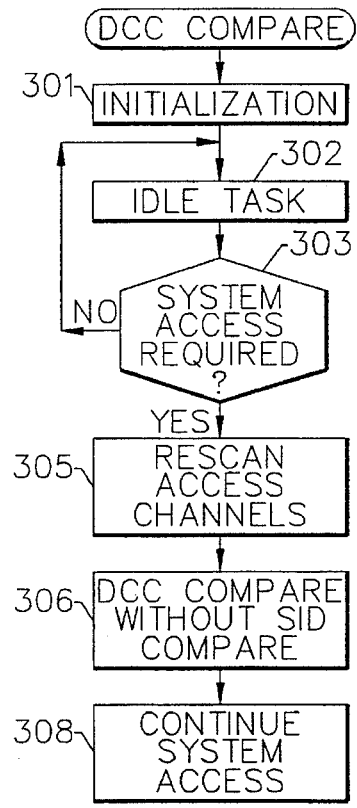
Figure 3C:
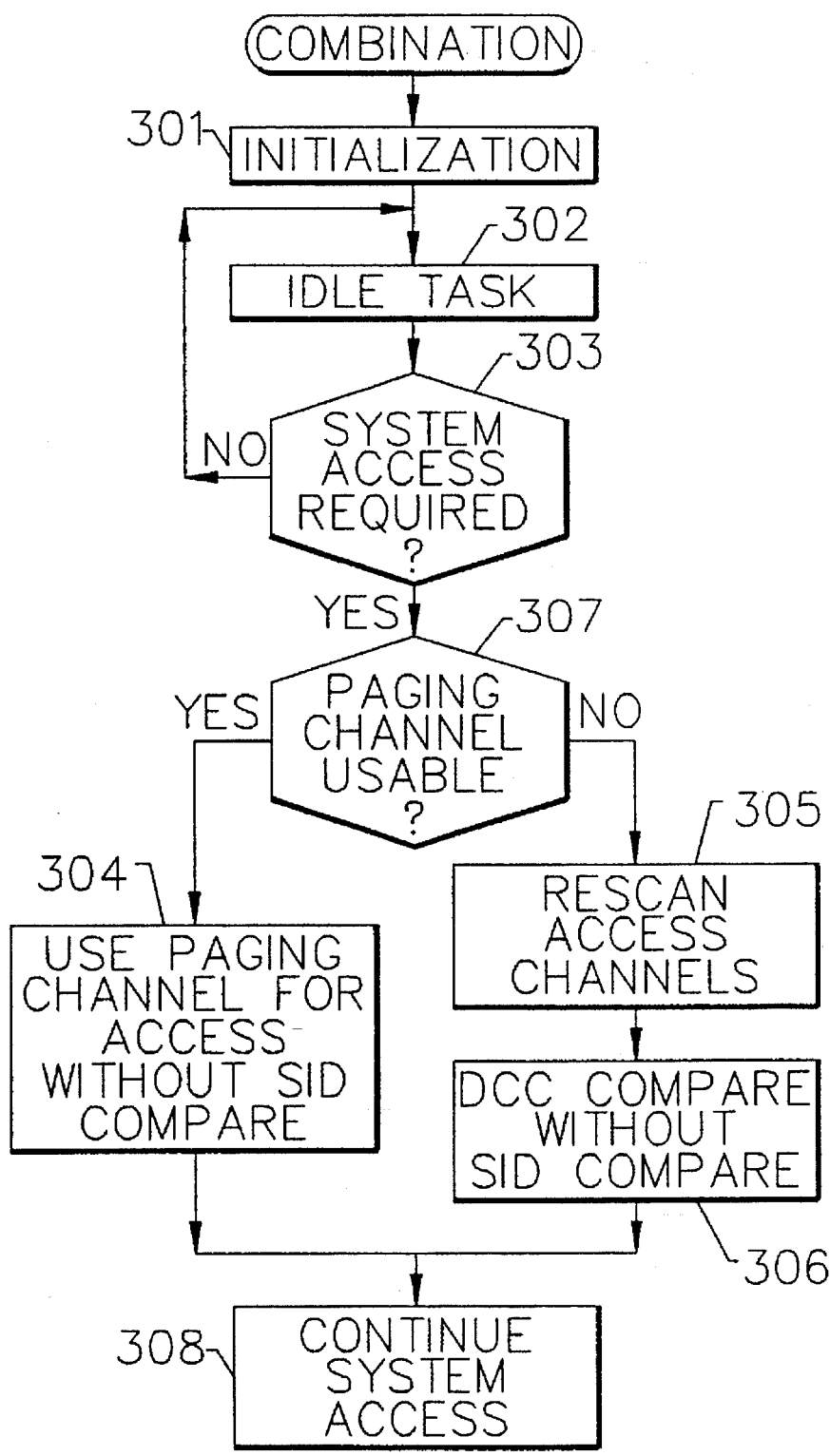

Referring now to FIGS. 3A–3C, three alternate embodiments of the present invention are described. The embodiment of FIG. 3A performs the "No Rescan" aspect of the present invention. The embodiment of FIG. 3B performs the "DCC Compare" aspect and the embodiment of FIG. 3C performs a combination of the "No Rescan" and "DCC Compare". None of these embodiments require a comparison of System IDentification (SID) as part of a system access. It will be understood by those having skill in the art that the operations described in FIGS. 3A–3C are preferably performed by the control processor 204 of FIG. 2 under stored program control.

Referring again to FIGS. 3A, 3B and 3C, operations begin by performing initialization at Block 301. Initialization operations are defined for each cellular radiotelephone system standard. However, all initialization procedures have common elements. The present invention will be described with respect to Standard IS-54B. However, it will be understood by those having skill in the art that other cellular radiotelephone system standards may be used.

In general, during initialization, the Dedicated Control Channels are scanned for the strongest Dedicated Control Channels. The Dedicated Control Channels are then tuned in the order of highest signal strength to extract overhead information. If the SID of the Dedicated Control Channel is acceptable, then the Paging Channel set is scanned for the strongest Paging Channels and the strongest Paging Channels are saved. These Paging Channels are then tuned in the order of decreasing signal strength and overhead information is extracted. Assuming the SID matches that of the Dedicated Control Channel and assuming Paging and Access Channels are not combined, the Access Channel set is scanned and the strongest Access Channels are tuned to extract overhead information. Assuming the system identification matches, then the strongest Access Channels are saved. Thus, during initialization, a set of strongest Dedicated Control Channels, Paging Channels and Access Channels belonging to the home cellular radiotelephone system is established.

After initialization, the system enters the idle task at Block 302. The idle task is a state wherein the cellular radiotelephone responds to overhead information, responds to page messages, responds to orders and responds to user initiation of a call. The idle task is defined, for example, in Section 2.6.2 of IS-54B.

Continuing with the description of FIGS. 3A–3C, at Block 303 a test is made as to whether system access is required. System access may be required as a result of a required response to a page message or as a result of a user initiating a telephone call.

When a system access is required, the present invention will respond based on whether the No Rescan, DCC Compare or combination system access is performed. If No Rescan is performed, then at Block 304 the strongest Paging Channel which was obtained during initialization, and to which the cellular radiotelephone is presently tuned, is used for access without performing a subsequent SID compare of the overhead SID information which is received during the system access. Accordingly, this operation uses the same Paging Channel which was used during initialization without performing a separate rescan of Paging or Access Channels. System access then continues at Block 308. It will be understood that if the strongest Paging Channel is of marginal strength for continued communications, the cellular radiotelephone system can transmit a "Directed Retry" message as part of the system access process, in order to redirect the cellular radiotelephone to another channel set.

Referring to FIG. 3B, in the DCC Compare operation, a rescan of the previously saved highest signal strength Access Channels is performed and overhead information is extracted on the strongest channel. The extracted overhead information includes a value of the Digital Color Code (DCC) but does not include the SID. Then, at Block 306, the DCC of the rescanned Access Channel is compared with the DCC of the initially scanned Access Channel. If they match, system access is continued at Block 308 using the rescanned Access Channel, without an SID compare.

FIG. 3C combines the No Rescan and DCC Compare operations. As Block 307, a test is made as to whether the Paging Channel which was used upon initialization is useable. For example, a test for threshold received signal strength level is made. If the Paging Channel is useable, then the No Rescan operation is performed at Block 304. On the other hand, if the received signal strength of the Paging Channel is too low, then a rescan is performed at Block 305 and DCC Compare is performed at Block 306.

Figure 4A:
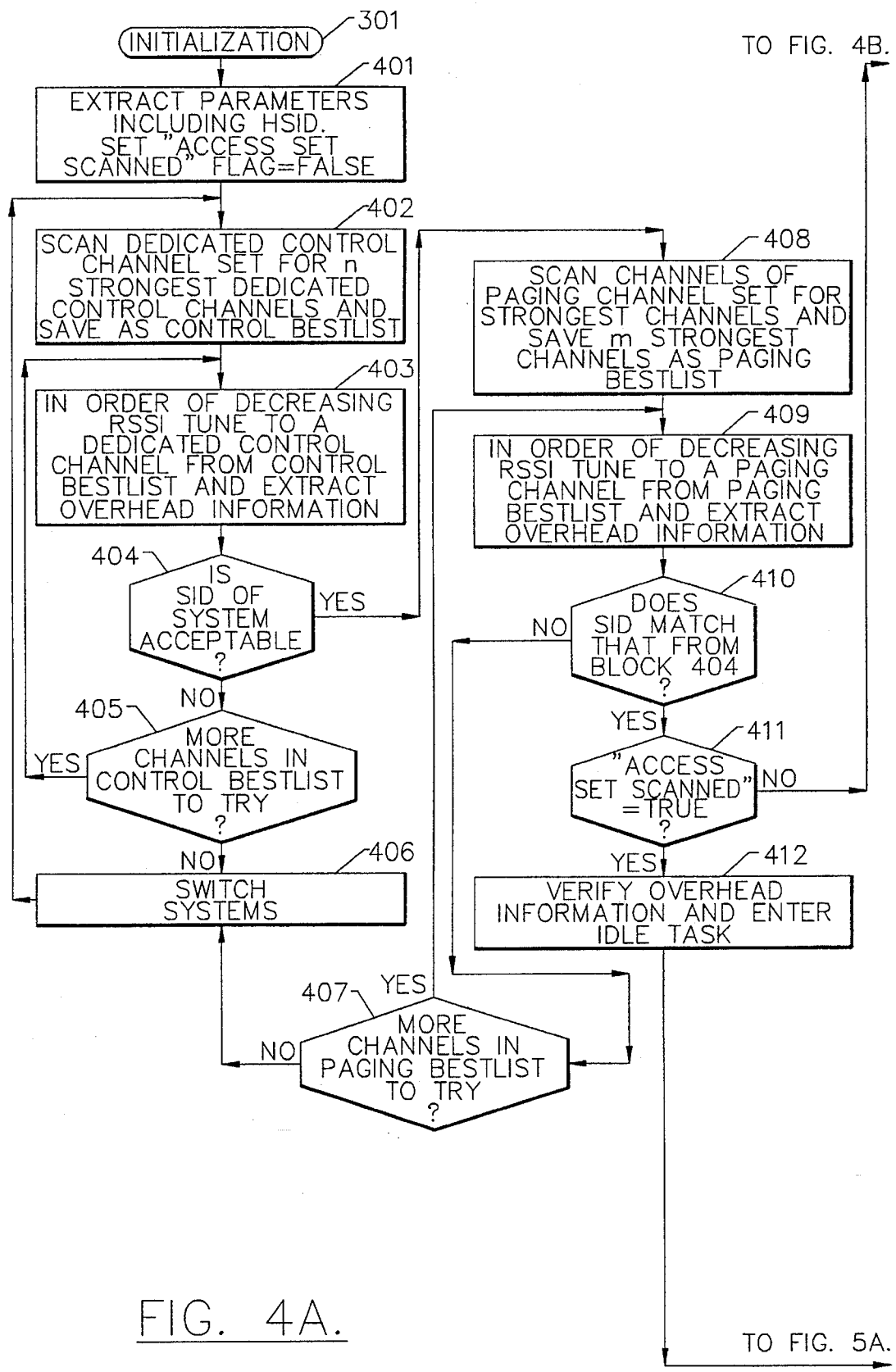
FIGS. 4A–4B illustrate detailed operations for cellular radiotelephone initialization according to the present invention.
Figure 4B:
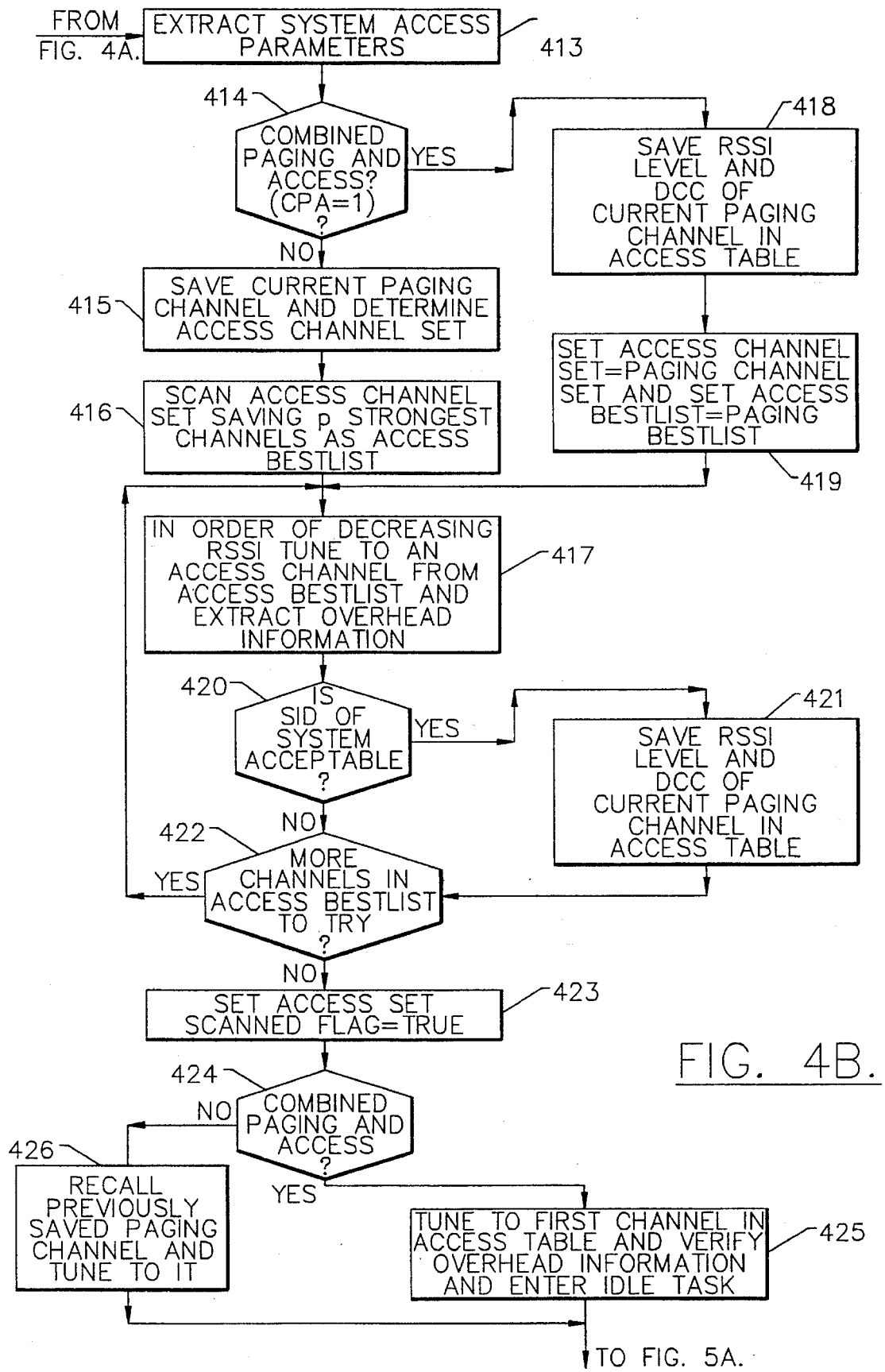

Referring now to FIGS. 4A and 4B, detailed operations for performing initialization (Block 301 of FIGS. 3A–3C) are described. It will be understood by those having skill in the art that all of the operations need not be performed for particular embodiments of the invention or under particular cellular radiotelephone standards.

Referring now to FIGS. 4A–4S, after cellular radiotelephone power-on, the cellular radiotelephone must extract certain operational parameters from permanent or semipermanent memory 205. As shown at Block 401, one of the parameters is the Home System IDentification (HSID). The cellular radiotelephone also initializes the data structures and various channel ranges which are used in accessing the cellular radiotelephone system. A flag to indicate that the Access Channels have been scanned is cleared (set to FALSE). This flag is used when determining whether the Paging Channels need to be rescanned after scanning the Access Channels and filling out the Access Table as described below. It will be understood by those having skill in the art that this operation may need only be performed when Combined Paging and Access Channels are not being used.

Referring now to Block 402, in order to obtain service from the cellular radiotelephone system, the cellular radiotelephone must scan for Dedicated Control Channels that are assigned to the system type desired. It will be understood by those having skill in the art that the Dedicated Control Channel set is range of channels specified by the Federal Communications Commission (FCC) in the United States and the cellular system specification both for analog (IS-553) and dual mode (IS-545) cellular radiotelephone systems. The cellular radiotelephone scans the Dedicated Control Channels from the first Dedicated Control Channel to the last Dedicated Control Channel, measuring the Received Signal Strength Indication (RSSI) of each of the channels. The cellular radiotelephone saves n of the strongest Dedicated Control Channels in an ordered table called the Control Bestlist.

Then, referring to Block 403, the cellular radiotelephone tunes to the strongest channel from the Control Bestlist and attempts to synchronize and extract overhead information from the Dedicated Control Channel. If no overhead information can be found on the strongest channel, the cellular radiotelephone will tune to the next channel on the list and attempt to extract overhead information.

After extracting the SID from the overhead information, the cellular radiotelephone determines if the SID has an acceptable value at Block 404. This is usually performed by comparing the extracted SID against the a HSID or list of cooperating SIDs. If the SID is not acceptable, then the cellular telephone will disregard the current Dedicated Control Channel, tune to the next candidate channel in the Control Bestlist if one is available (Block 405), and once again attempt to synchronize and extract the overhead data of the channel at Block 403. If there are no more candidate channels from the Control Bestlist, then the cellular radiotelephone may attempt to acquire service on the alternate system or may modify what it deems as an acceptable SID through some automatic or user action at Block 406. Operations for switching to an alternate system are known to those having skill in the art and need not be described further herein.

Returning again to Block 404, once an acceptable SID has been found on one of the Dedicated Control Channels, the cellular radiotelephone will continue to process the overhead message train by extracting other information required to determine the Paging Channel set of the system. The Paging Channel set is a range of channels that comprise the Paging Channels of the cellular radiotelephone system. This set is bounded between and includes channels from a first Paging Channel to a last Paging Channel. The cellular radiotelephone scans the Paging Channel set at Block 408 and saves the m strongest channels in an ordered list called the Paging Bestlist. The Paging Bestlist is a list, usually in descending order of RSSI, of the m strongest channels obtained from scanning the Paging Channel set.

Referring now to Block 409, the cellular radiotelephone tunes to a channel from the Paging Bestlist and attempts to synchronize and extract the overhead information from the channel. The cellular radiotelephone will extract the value of SID from the overhead information and compare that to the SID that it previously received on the Dedicated Control Channel at Block 403. If the SID of the Paging Channel under examination does not match the SID that was extracted from the Dedicated Control Channel (Block 410), then the other channels from the Paging Bestlist are examined at Block 407. If there are no more channels in the Paging Bestlist to examine, then the Dedicated Control Channels are reexamined. A switch of preferred system type can also take place as already explained at Block 406.

Returning again to Block 410, if the SID of a Paging Channel under examination does match the SID that was extracted on the Dedicated Control Channel, then the Access Set Scan Flag is examined to determine if the Access Channels have already been scanned, at Block 411. If the Access Channels have already been scanned, then the overhead information is updated at Block 412 and the idle task is entered (Block 302 of FIGS. 3A–3C and 5).

Referring again to Block 411, if the Access Channels have not yet been scanned, then the access parameters are extracted from the overhead message train that was received on the Paging Channel at Block 413. If the system is using Combined Paging and Access Channels (Block 414), then the current Paging Channel is also an Access Channel. This channel number along with its RSSI and DCC are placed into an Access Table at Block 418. Because the system is using Combined Paging and Access Channels, the Access Channel set is the same as the Paging Channel set. The Access Channel set does not have to be rescanned, and the Access Bestlist can be set equal to the Paging Bestlist at Block 419. The cellular radiotelephone then proceeds with tuning and examining the SID of the access Bestlist at Block 417 as will be described below.

Returning to Block 414, if the system is not using Combined Paging and Access Channels, then the cellular radiotelephone saves the current paging channel and must determine the Access Channel set based upon the information extracted from the overhead message train on the Paging Channel, at Block 415. It will be understood by those have skill in the art that the Access Channel set is a range of channels that comprise the Access Channels of the cellular system. The set is bounded between and includes the channels from a first Access Channel to a last Access Channel.

Referring to Block 416, the cellular radiotelephone then scans the Access Channel set, saving the p strongest channels in the access Bestlist at Block 416. Referring now to Block 417, the cellular radiotelephone tunes to each channel in the Access Bestlist and attempts to synchronize and extract the overhead data. If overhead data is obtained, then the SID and DCC of the overhead message are extracted at Block 317. The cellular radiotelephone will then compare the SID received on the Access Channel under examination to determine if it is acceptable, at Block 420. If acceptable, the RSSI, DCC and channel number are stored in an Access Table at Block 421. A sample Access Table is shown below:

ACCESS TABLE

| Table Index | Channel Number | RSSI | DCC |
| --- | --- | --- | --- |
| 1 | | | |
| 2 | | | |

ACCESS TABLE-continued

| Table Index | Channel Number | RSSI | DCC |
| --- | --- | --- | --- |
| 3 | | | |
| . | . | . | . |
| . | . | . | . |
| . | . | . | . |
| p-1 | | | |
| p | | | |

Other Access Table formats will be understood by those having skill in the art. It is important to note that the Access Table contains the DCC in order to practice the DCC Compare operation. It does not, and need not, contain the SID.

The operations of tuning to a channel in the Access List, receiving an overhead message train, extracting the SID and DCC and optionally storing the values in the Access Table if acceptable (Blocks 417, 418 and 421), continue until all channels from the Access Bestlist have been examined. See Block 422.

Once the Access Bestlist has been exhausted, the Access Scanned Flag is set at Block 423. The CPA bit that was extracted from the paging channel is then reexamined at Block 424 to determine if the system is using Combined Paging and Access Channels at Block 424. If yes, then the cellular radiotelephone tunes to the first channel in the Access Table, acquires synchronization, and updates the overhead message information at Block 425. If no, the cellular radiotelephone recalls the previously saved paging channel, from Block 415, and tunes to it at Block 426. The cellular radiotelephone then enters the idle task, which is also shown as the first block of FIG. 5A. If Combined Paging and Access Channels are not being used (Block 424) the cellular radiotelephone bypasses Block 425 and enters the idle task.

Figure 5A:
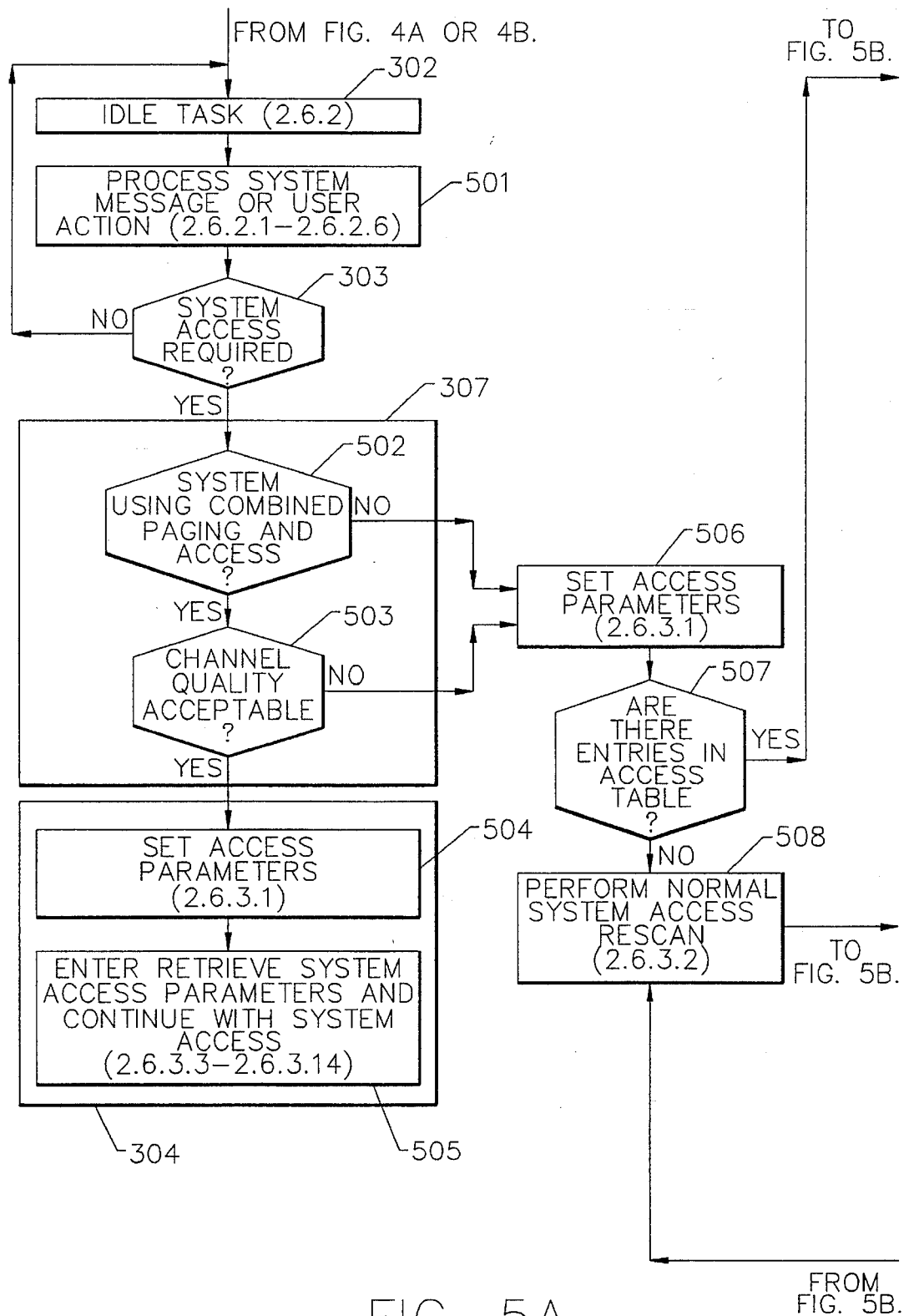
FIGS. 5A–5B illustrate detailed operations for accessing a cellular radiotelephone system according to the present invention.
Figure 5B:
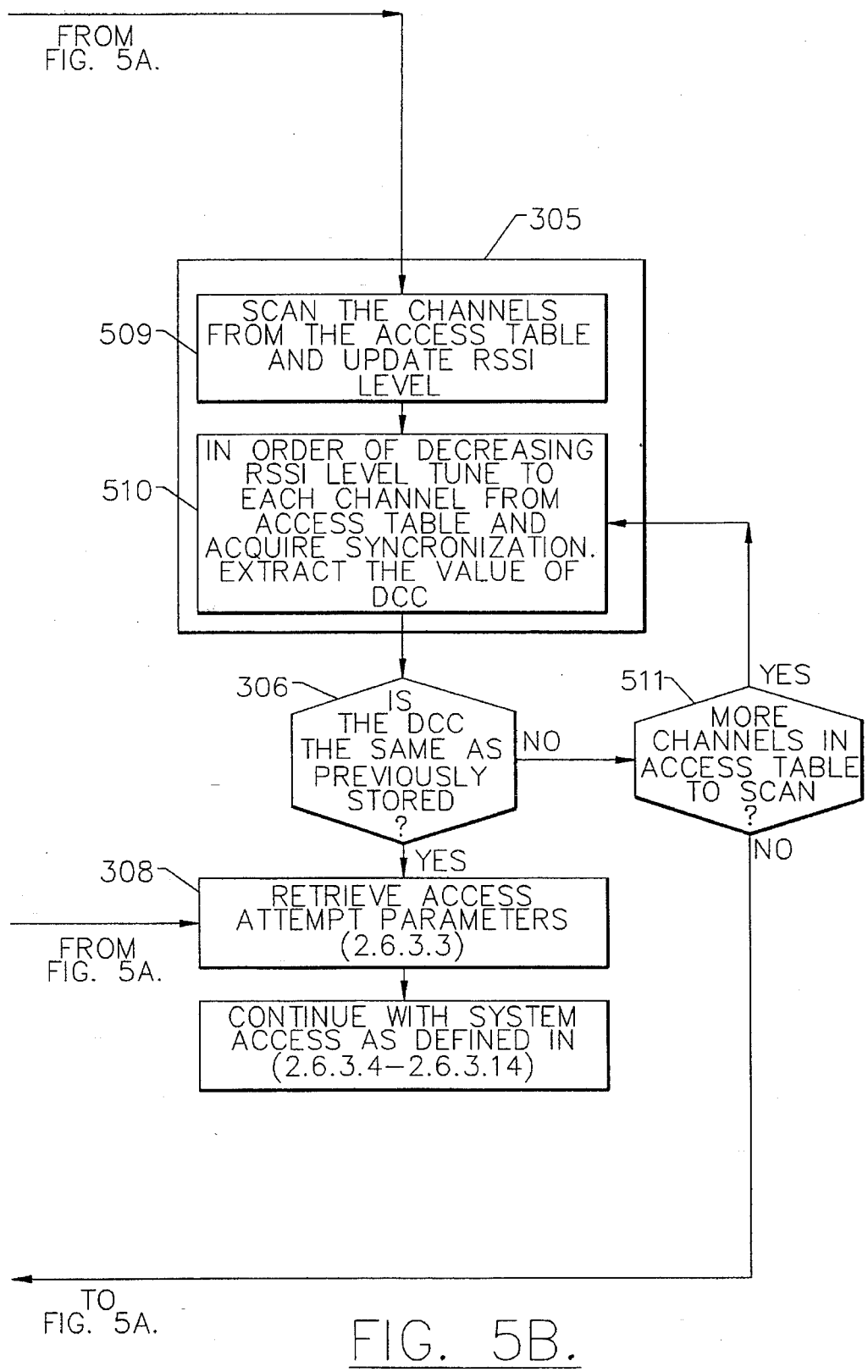

Referring now to FIGS. 5A and 5S, while in the idle task, at Block 302, the cellular radiotelephone processes system messages that are sent on the Paging or Access Channel that the cellular radiotelephone is currently monitoring and responds to user actions at Block 501. (IS-54B section 2.6.2) If, due to a particular cellular radiotelephone system control message, system overhead information or user action, the cellular radiotelephone must access the cellular radiotelephone system (Block 303), the cellular radiotelephone first sets its access attempt parameters at Block 506, as specified in IS-54B section 2.6.3.1. These parameters include but are not limited to the maximum number of busy idle failures and collisions, and whether the cellular radiotelephone should wait for a control filler message before attempting access.

First, at Block 307, a test is made as to whether the Paging Channels are usable. Thus, as shown at Block 502, a test is made if the system is using Combined Paging and Access Channels. If yes, a test is made at Block 503 as to whether the current Paging Channel is usable. Examples of a test would be RSSI level above a threshold value or bit error rate below a predetermined value. If the channel quality is acceptable at Block 503, then the cellular radiotelephone performs the "No Rescan" operation, using the Paging Channel for access without performing an SID compare at Block 304. In particular, access parameters are set at Block 504 and the system access parameters are retrieved. The system access is continued at Block 505, for example, as specified in IS-54B sections 2.6.3.3–2.6.3.14. It will be understood that the operation of rescanning Access Channels (IS-54B section 2.5.3.2) has been skipped.

Alternatively, if the cellular radiotelephone is operating in a cellular radiotelephone system without Combined Paging and Access Channels (Block 502) or the signal quality is not sufficient to use the current Paging Channel (Block 503), then the "DCC Compare" operation is performed. At Block 506, the access parameters are set and at Block 507 a test is made as to whether previously stored acceptable Access Channels were stored in the Access Table. If yes, a rescan is performed of the channels that are listed in the Access Table, at Block 509. If there were no channels in the Access Table, then the cellular radiotelephone performs a normal system access rescan as defined, for example, in Section 2.6.3.2 of IS-54B, at Block 508.

If there are entries in the Access Table, then a rescan of the Access Channels is performed at Block 305. In particular, at Block 509, the Access Channels that are listed in the Access Table are rescanned at Block 509. At Block 510, the cellular radiotelephone then tunes the strongest channel from the Access Table and attempts to synchronize and obtain overhead data at Block 510. It will be understood that other criteria may be used for tuning to a channel from the Access Table. For example, a largest change in RSSI may be detected.

The cellular radiotelephone extracts the value of the DCC from the overhead data and compares that to the value of the DCC that was previously stored for that Access Channel in the Access Table, at Block 306. If the DCC is the same, then the cellular radiotelephone will retrieve the system access parameters at Block 512 and then enter the seize reverse control channel task at Block 308. Alternatively, if the DCC of the Access Channel is not the same as stored in the Access Table (Block 306), the cellular radiotelephone will select the next strongest channel in the Access Table and attempt to obtain synchronization and DCC comparison until either a match is found or the Access Table is exhausted, at Block 511. If a DCC match cannot be found, the cellular radiotelephone can enter the normal scan access channel task (IS-54B Section 2.6.3.2) to find a channel and then access the system at Block 508.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of accessing a cellular radiotelephone system by a cellular radiotelephone, said cellular radiotelephone system including a plurality of Dedicated Control Channels and a plurality of Combined Paging and Access Channels associated therewith, each Dedicated Control Channel and Combined Paging and Access Channel transmitting a System IDentification (SID) which is unique to said cellular radiotelephone system, each Combined Paging and Access Channel also transmitting a Digital Color Code (DCC), said accessing method comprising the steps of:

identifying at least one Dedicated Control Channel having a predetermined System IDentification, prior to a required system access;

identifying a plurality of first Combined Paging and Access Channels having said predetermined System IDentification, prior to a required system access;

in response to a required system access, testing whether at least one of the first Combined Paging and Access Channels is useable for a system access;

if the at least one of the first Combined Paging and Access channels is useable, using the at least one of the first Combined Paging and Access Channels to access the cellular radiotelephone system, without comparing the System IDentification transmitted by the at least one of the first Combined Paging and Access Channels with a System IDentification which is stored in said cellular radiotelephone;

if the at least one of the first Combined Paging and Access Channels is unusable, identifying a plurality of second Combined Paging and Access Channels without comparing the System IDentification transmitted by the plurality of second Combined Paging and Access Channels with a System IDentification which is stored in said cellular radiotelephone;

comparing the Digital Color Code of at least one of the plurality of second Combined Paging and Access Channels with the Digital Color Code of corresponding at least one of the plurality of first Combined Paging and Access Channels; and if the Digital Color Codes match, using the at least one of the second plurality of Combined Paging and Access Channels to access the cellular radiotelephone system, without comparing the System IDentification transmitted by the at least one of the second plurality of Combined Paging and Access Channels with a System IDentification which is stored in said cellular radiotelephone.

2. A method according to claim 1 wherein said step of identifying a plurality of first Combined Paging and Access Channels comprises the step of identifying a first Combined Paging and Access Channel having a highest received signal strength.

3. A method according to claim 2 wherein said step of testing whether at least one of the first Combined Paging and Access Channels is useable for a system access comprises the step of testing whether the received signal strength of said first Combined Paging and Access Channel exceeds a predetermined threshold.

4. A method according to claim 3 wherein said step of using the at least one of the first Combined Paging and Access Channels comprises the step of using said first Combined Paging and Access Channel to access said cellular radiotelephone system.

5. A method according to claim 1 wherein said step of identifying a plurality of first Combined Paging and Access Channels comprises the step of identifying a plurality of first Combined Paging and Access Channels having highest received signal strength and having said predetermined System IDentification.

6. A method according to claim 5 wherein said step of identifying a plurality of second Combined Paging and Access Channels comprises the step of identifying a plurality of second Combined Paging and Access Channels having highest received signal strength, regardless of the System IDentification.

7. A method according to claim 6 wherein said step of comparing the Digital Color Code comprises the step of comparing the Digital Color Code of one of said plurality of second Combined Paging and Access Channels having highest received signal strength with the Digital Color Code of the corresponding one of the plurality of first Combined Paging and Access Channels.

8. A method according to claim 1 wherein said step of identifying a plurality of second Combined Paging and Access Channels comprises the step of storing at least some of said second plurality of second Combined Paging and Access Channels in an Access Table, in an order of decreasing received signal strength, along with the corresponding Digital Color Code and without the corresponding System IDentification.

9. A method according to claim 1 wherein said predetermined System IDentification comprises a Home System IDentification.

10. A method of accessing a cellular radiotelephone system by a cellular radiotelephone, said cellular radiotelephone system including a plurality of Dedicated Control Channels and a plurality of Combined Paging and Access Channels associated therewith, each Dedicated Control Channel and Combined Paging and Access Channel transmitting a System IDentification which is unique to said cellular radiotelephone system, said accessing method comprising the steps of:

identifying at least one Dedicated Control Channel having a predetermined System IDentification, prior to a required system access;

identifying a plurality of Combined Paging and Access Channels having said predetermined System IDentification, prior to a required system access; and in response to a required system access, using one of the identified Combined Paging and Access Channels to access the cellular radiotelephone system, without comparing the System IDentification transmitted by the one of the identified Combined Paging and Access Channels with a System IDentification which is stored in said cellular radiotelephone.

11. A method according to claim 10 wherein said step of identifying a plurality of first Combined Paging and Access Channels comprises the step of identifying a first Combined Paging and Access Channel having a highest received signal strength.

12. A method according to claim 11 wherein said testing step comprises the step of testing whether the received signal strength of said first Combined Paging and Access Channel exceeds a predetermined threshold.

13. A method according to claim 12 wherein said step of using the at least one of the first Combined Paging and Access Channels comprises the step of using said first Combined Paging and Access Channel to access said cellular radiotelephone system.

14. A method of accessing a cellular radiotelephone system by a cellular radiotelephone, said cellular radiotelephone system including a plurality of Dedicated Control Channels and a plurality of Access Channels associated therewith, each Dedicated Control Channel and Access Channel transmitting a System IDentification (SID) which is unique to said cellular radiotelephone system, each Access Channel also transmitting a Digital Color Code (DCC), said accessing method comprising the steps of:

identifying at least one Dedicated Control Channel having a predetermined System IDentification, prior to a required system access;

identifying a plurality of first Access Channels having said predetermined System IDentification, prior to a required system access;

in response to a required system access, identifying a plurality of second Access Channels without comparing the System IDentification transmitted by the plurality of second Access Channels with a System IDentification which is stored in said cellular radiotelephone;

comparing the Digital Color Code of at least one of the plurality of second Access Channels with the Digital Color Code of corresponding at least one of the plurality of first Access Channels; and if the Digital Color Codes match, using the at least one of the second plurality of Access Channels to access the cellular radiotelephone system, without comparing the System IDentification transmitted by the at least one of the second plurality of Access Channels with a System IDentification which is stored in said cellular radiotelephone.

15. A method according to claim 14 wherein said step of identifying a plurality of first Combined Paging and Access Channels comprises the step of identifying a plurality of first Combined Paging and Access Channels having highest received signal strength and having said predetermined System IDentification.

16. A method according to claim 15 wherein said step of identifying a plurality of second Combined Paging and Access Channels comprises the step of identifying a plurality of second Combined Paging and Access Channels having highest received signal strength, regardless of the System IDentification.

17. A method according to claim 16 wherein said step of comparing the Digital Color Code comprises the step of comparing the Digital Color Code of one of said plurality of second Combined Paging and Access Channels having highest received signal strength with the Digital Color Code of the corresponding one of the plurality of first Combined Paging and Access Channels.

18. A method according to claim 17 wherein said step of identifying a plurality of second Combined Paging and Access Channels comprises the step of storing at least some of said second plurality of second Combined Paging and Access Channels in an Access Table, in an order of decreasing received signal strength, along with the corresponding Digital Color Code and without the corresponding System IDentification.

19. A method according to claim 14 wherein said predetermined System IDentification comprises a Home System IDentification.

20. A method of accessing a cellular radiotelephone system by a cellular radiotelephone, said cellular radiotelephone system including a plurality of Access Channels, said accessing method comprising the steps of:

initializing said cellular radiotelephone;

waiting for a required system access; and in response to a required system access, accessing said cellular radiotelephone system using one of said plurality of Access Channels without comparing the System IDentification of said one of said plurality of Access Channels with a System IDentification which is stored in said cellular radiotelephone.

21. A method according to claim 20 wherein said accessing step comprises the step of accessing the cellular radiotelephone system if the Digital Color Code of said one of said plurality of Access Channels is a predetermined Digital Color Code.

22. A method according to claim 20 wherein said waiting step comprises the step of waiting for a required system access via a predetermined Combined Paging and Access Channel, and wherein said step of accessing said cellular radiotelephone system comprises the step of accessing said cellular radiotelephone system using said predetermined Combined paging and Access Channel.

23. A cellular radiotelephone for accessing a cellular radiotelephone system, said cellular radiotelephone system including a plurality of Dedicated Control Channels and a plurality of Combined Paging and Access Channels associated therewith, each Dedicated Control Channel and Combined Paging and Access Channel transmitting a System IDentification (SID) which is unique to said cellular radiotelephone system, each Combined Paging and Access Channel also transmitting a Digital Color Code (DCC), said cellular radiotelephone comprising:

means, responsive to activation of said cellular radiotelephone, for identifying at least one Dedicated Control Channel having a predetermined System IDentification;

means, responsive to said Dedicated Control Channel identifying means, for identifying a plurality of first Combined Paging and Access Channels having said predetermined System IDentification;

means, responsive to a required system access, for testing whether at least one of the first Combined Paging and Access Channels is useable for a system access;

means, responsive to said testing means, for using the at least one of the first Combined Paging and Access Channels to access the cellular radiotelephone system, without comparing the System IDentification transmitted by the at least one of the first Combined Paging and Access Channels with a System IDentification which is stored in said cellular radiotelephone, if the at least one of the first Combined Paging and Access channels is useable;

means, responsive to said testing means, for identifying a plurality of second Combined Paging and Access Channels without comparing the System IDentification transmitted by the plurality of second Combined Paging and Access Channels with a System IDentification which is stored in said cellular radiotelephone, if the at least one of the first Combined Paging and Access Channel is unusable;

means, responsive to said second Combined Paging and Access Channels identifying means, for comparing the Digital Color Code of at least one of the plurality of second Combined Paging and Access Channels with the Digital Color Code of corresponding at least one of the plurality of first Combined Paging and Access Channels; and means, responsive to said comparing means, for using the at least one of the second plurality of Combined Paging and Access Channels to access the cellular radiotelephone system, without comparing the System IDentification transmitted by the at least one of the second plurality of Combined Paging and Access Channels with a System IDentification which is stored in said cellular radiotelephone, if the Digital Color Codes match.

24. A cellular radiotelephone according to claim 23 wherein said means for identifying a plurality of first Combined Paging and Access Channels comprises means for identifying a first Combined Paging and Access Channel having a highest received signal strength.

25. A cellular radiotelephone according to claim 24 wherein said testing means comprises means for testing whether the received signal strength of said first Combined Paging and Access Channel exceeds a predetermined threshold.

26. A cellular radiotelephone according to claim 25 wherein said means for using the at least one of the first Combined Paging and Access Channels comprises means for using said first Combined Paging and Access Channel to access said cellular radiotelephone system.

27. A cellular radiotelephone according to claim 23 wherein said means for identifying a plurality of first Combined Paging and Access Channels comprises means for identifying a plurality of first Combined Paging and Access Channels having highest received signal strength and having said predetermined System IDentification.

28. A cellular radiotelephone according to claim 27 wherein said means for identifying a plurality of second Combined Paging and Access Channels comprises means for identifying a plurality of second Combined Paging and Access Channels having highest received signal strength, regardless of the System IDentification.

29. A cellular radiotelephone according to claim 28 wherein said means for comparing the Digital Color Code comprises means for comparing the Digital Color Code of one of said plurality of second Combined Paging and Access Channels having highest received signal strength with the Digital Color Code of the corresponding one of the plurality of first Combined Paging and Access Channels.

30. A cellular radiotelephone according to claim 23 wherein said means for identifying a plurality of second Combined Paging and Access Channels comprises means for storing at least some of said second plurality of second Combined Paging and Access Channels in an Access Table, in an order of decreasing received signal strength, along with the corresponding Digital Color Code and without the corresponding System IDentification.

31. A cellular radiotelephone according to claim 23 wherein said predetermined System IDentification comprises a Home System IDentification.

32. A cellular radiotelephone for accessing a cellular radiotelephone system, said cellular radiotelephone system including a plurality of Dedicated Control Channels and a plurality of Combined Paging and Access Channels associated therewith, each Dedicated Control Channel and Combined Paging and Access Channel transmitting a System IDentification which is unique to said cellular radiotelephone system, said cellular radiotelephone comprising:

means, responsive to activation of said cellular radiotelephone, for identifying at least one Dedicated Control Channel having a predetermined System IDentification;

means, responsive to said Dedicated Control Channel identifying means, for identifying a plurality of Combined Paging and Access Channels having said predetermined System IDentification; and means, responsive to a required system access, for using one of the identified Combined Paging and Access Channels to access the cellular radiotelephone system, without comparing the System IDentification transmitted by the one of the identified Combined Paging and Access Channels with a System IDentification which is stored in said cellular radiotelephone.

33. A cellular radiotelephone according to claim 32 wherein said means for identifying a plurality of first Combined Paging and Access Channels comprises means for identifying a first Combined Paging and Access Channel having a highest received signal strength.

34. A cellular radiotelephone according to claim 33 wherein said testing means comprises means for testing whether the received signal strength of said first Combined Paging and Access Channel exceeds a predetermined threshold.

35. A cellular radiotelephone according to claim 34 wherein said means for using the at least one of the first Combined Paging and Access Channels comprises means for using said first Combined Paging and Access Channel to access said cellular radiotelephone system.

36. A cellular radiotelephone for accessing a cellular radiotelephone system, said cellular radiotelephone system including a plurality of Dedicated Control Channels and a plurality of Access Channels associated therewith, each Dedicated Control Channel and Access Channel transmitting a System IDentification (SID) which is unique to said cellular radiotelephone system, each Access Channel also transmitting a Digital Color Code (DCC), said cellular radiotelephone comprising:

means, responsive to activation of said cellular radiotelephone, for identifying at least one Dedicated Control Channel having a predetermined System IDentification;

means, responsive to said Dedicated Control Channel identifying means, for identifying a plurality of first Access Channels having said predetermined System IDentification;

means, responsive to a required system access, for identifying a plurality of second Access Channels without comparing the System IDentification transmitted by the plurality of second Access Channels with a System IDentification which is stored in said cellular radiotelephone;

means, responsive to said second Combined Paging and Access Channels identifying means, for comparing the Digital Color Code of at least one of the plurality of second Access Channels with the Digital Color Code of corresponding at least one of the plurality of first Access Channels; and means, responsive to said comparing means, for using the at least one of the second plurality of Access Channels to access the cellular radiotelephone system, without comparing the System IDentification transmitted by the at least one of the second plurality of Access Channels with a System IDentification which is stored in said cellular radiotelephone, if the Digital Color Codes match.

37. A cellular radiotelephone according to claim 36 wherein said means for identifying a plurality of first Combined Paging and Access Channels comprises means for identifying a plurality of first Combined Paging and Access Channels having highest received signal strength and having said predetermined System IDentification.

38. A cellular radiotelephone according to claim 37 wherein said means for identifying a plurality of second Combined Paging and Access Channels comprises means for identifying a plurality of second Combined Paging and Access Channels having highest received signal strength, regardless of the System IDentification.

39. A cellular radiotelephone according to claim 38 wherein said means comparing the Digital Color Code comprises means for comparing the Digital Color Code of one of said plurality of second Combined Paging and Access Channels having highest received signal strength with the Digital Color Code of the corresponding one of the plurality of first Combined Paging and Access Channels.

40. A cellular radiotelephone according to claim 39 wherein said means for identifying a plurality of second Combined Paging and Access Channels comprises means for storing at least some of said second plurality of second Combined Paging and Access Channels in an Access Table, in an order of decreasing received signal strength, along with the corresponding Digital Color Code and without the corresponding System IDentification.

41. A cellular radiotelephone according to claim 36 wherein said predetermined System IDentification comprises a Home System IDentification.

42. A cellular radiotelephone for accessing a cellular radiotelephone system, said cellular radiotelephone system including a plurality of Access Channels, said cellular radiotelephone comprising:

means for initializing said cellular radiotelephone;

means, responsive to said initializing means, for waiting for a required system access; and means, responsive to a required system access, for accessing said cellular radiotelephone system using one of said plurality of Access Channels without comparing the System IDentification of said one of said plurality of Access Channels with a System IDentification stored in said cellular radiotelephone.

43. A cellular radiotelephone according to claim 42 wherein said accessing means comprises means for accessing the cellular radiotelephone system if the Digital Color Code of said one of said plurality of Access Channels is a predetermined Digital Color Code.

44. A cellular radiotelephone according to claim 42 wherein said waiting means comprises means for waiting for a required system access via a predetermined Combined Paging and Access Channel, and wherein said means for accessing said cellular radiotelephone system comprises means for accessing said cellular radiotelephone system using said predetermined Combined paging and Access Channel.

* * * * *

UNITED STATES PATENT AND TRADEMARK OFFICE
CERTIFICATE OF CORRECTION

PATENT NO. : 5,517,673
DATED : May 14, 1996
INVENTOR(S) : Michael D. Fehnel

It is certified that error appears in the above-identified patent and that said Letters Patent is hereby corrected as shown below:

```
Column 7, line 65, "45" should be --4B--.
Column 8, line 22, "545" should be --54B--.
Column 10, line 36, "55" should be --5B--.
```

Signed and Sealed this

First Day of October, 1996

Attest:

BRUCE LEHMAN

*Attesting Officer*     Commissioner of Patents and Trademarks